(12) United States Patent
Maggi et al.

(10) Patent No.: US 12,075,363 B2
(45) Date of Patent: Aug. 27, 2024

(54) DETERMINING A RADIO TRANSMISSION POWER THRESHOLD, AND RELATED DEVICES, METHODS AND COMPUTER PROGRAMS

(71) Applicant: Nokia Solutions and Networks Oy, Espoo (FI)

(72) Inventors: Lorenzo Maggi, Paris (FR); Alois Herzog, Nantes (FR); Afef Feki, Sceaux (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/537,952

(22) Filed: Dec. 13, 2023

(65) Prior Publication Data

US 2024/0205838 A1 Jun. 20, 2024

(30) Foreign Application Priority Data

Dec. 16, 2022 (FI) .................................. 20226115

(51) Int. Cl.
*H04W 52/22* (2009.01)
*H04W 52/36* (2009.01)

(52) U.S. Cl.
CPC ....... *H04W 52/228* (2013.01); *H04W 52/367* (2013.01)

(58) Field of Classification Search
CPC . H04W 52/22; H04W 52/221; H04W 52/223; H04W 52/225; H04W 52/226; H04W 52/228; H04W 52/36; H04W 52/367
See application file for complete search history.

(56) References Cited

U.S. PATENT DOCUMENTS

| | | | | |
|---|---|---|---|---|
| 6,356,607 | B1* | 3/2002 | Scott | H04J 13/107 |
| | | | | 375/E1.018 |
| 6,912,228 | B1* | 6/2005 | Dahlman | H04W 52/226 |
| | | | | 370/347 |
| 7,603,134 | B2* | 10/2009 | Cho | H04W 52/265 |
| | | | | 455/127.1 |
| 10,834,678 | B1* | 11/2020 | Marupaduga | H04W 52/367 |
| 2002/0090965 | A1* | 7/2002 | Chen | H04W 76/10 |
| | | | | 455/434 |

(Continued)

FOREIGN PATENT DOCUMENTS

| | | |
|---|---|---|
| EP | 4057707 A1 | 9/2022 |
| WO | WO-2018/002691 A1 | 1/2018 |
| WO | WO 2020/010232 A1 | 1/2020 |

OTHER PUBLICATIONS

3GPP TR 38.801 V14.0.0 (Mar. 2017), "3rd Generation Partnership Project; Technical Specification Group Radio Access Network; Study on new radio access technology: Radio access architecture and interfaces (Release 14)," Apr. 3, 2017.

(Continued)

*Primary Examiner* — Kevin D Mew
(74) *Attorney, Agent, or Firm* — Harrington & Smith

(57) ABSTRACT

Devices, methods and computer programs for determining a radio transmission power threshold are disclosed. At least some of the example embodiments described herein may allow improving resource usage by serving a maximum amount of traffic and not wasting resources, while also ensuring the possibility of serving a minimum traffic level.

9 Claims, 4 Drawing Sheets

(56) References Cited

U.S. PATENT DOCUMENTS

| | | | |
|---|---|---|---|
| 2005/0096075 A1* | 5/2005 | Zhang | H04W 52/343 |
| | | | 455/63.1 |
| 2010/0118702 A1* | 5/2010 | Wu | H04W 72/542 |
| | | | 370/235 |
| 2010/0260086 A1* | 10/2010 | Santhanam | H04W 52/248 |
| | | | 370/329 |
| 2012/0021800 A1* | 1/2012 | Wilson | H04W 72/02 |
| | | | 455/127.1 |
| 2012/0142291 A1* | 6/2012 | Rath | H04B 7/0613 |
| | | | 455/127.1 |
| 2017/0064641 A1* | 3/2017 | Logan | H04W 52/367 |
| 2017/0272186 A1* | 9/2017 | Yang | H04L 47/6245 |
| 2021/0067189 A1* | 3/2021 | Yu | H04W 52/367 |
| 2021/0185621 A1* | 6/2021 | Krenz | H04W 52/367 |
| 2022/0066456 A1* | 3/2022 | Ebrahimi Afrouzi | |
| | | | G06F 3/04883 |
| 2022/0240200 A1 | 7/2022 | Wigren et al. | |
| 2022/0386249 A1* | 12/2022 | Meshkati | H04W 52/146 |
| 2023/0156683 A1* | 5/2023 | Liu | H04W 72/0473 |
| | | | 370/329 |
| 2023/0199672 A1* | 6/2023 | Takeda | H04W 52/281 |
| | | | 455/323 |
| 2023/0328663 A1* | 10/2023 | Va | H04W 52/223 |
| | | | 370/318 |
| 2023/0337151 A1* | 10/2023 | Bertizzolo | H04W 52/367 |

OTHER PUBLICATIONS

Tornevik, Christer, et al., "Time Averaged Power Control of a 4G and a 5G Radio Base Station for RF EMF Compliance", IEEE Access, Nov. 2020, 14 pages.

* cited by examiner

DETERMINING A RADIO TRANSMISSION POWER THRESHOLD, AND RELATED DEVICES, METHODS AND COMPUTER PROGRAMS

TECHNICAL FIELD

The disclosure relates generally to communications and, more particularly but not exclusively, to determining a radio transmission power threshold, as well as related devices, methods and computer programs.

BACKGROUND

With the introduction of a new generation of mobile networks (such as fifth generation (5G) wireless networks), compliance aspects related to radio frequency (RF) electromagnetic field (EMF) exposure from radio transmitters are under study.

Currently, 5G NR supports leveraging an actual EMF exposure using an averaging time $T_{avg}$ of 1 to 30 minutes.

However, at least in some situations, current implementations may be overly conservative in that they may implicitly consider any past radio transmission power consumption below a given guaranteed level as equal to the guaranteed level, thereby potentially wasting resources.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a network node device comprises at least one processor, and at least one memory storing instructions that, when executed by the at least one processor, cause the network node device at least to perform evaluating a function of radio transmission power consumption over a current radio transmission power consumption sampling period at the end of the current radio transmission power consumption sampling period. The instructions, when executed by the at least one processor, further cause the network node device at least to perform executing a real time computation subprocedure for determining a radio transmission power threshold for a consecutive radio transmission power consumption sampling period based on the evaluated function of the radio transmission power consumption over the current radio transmission power consumption sampling period, such that the function of the radio transmission power consumption over a given radio transmission power consumption sampling period does not exceed the radio transmission power threshold for the given radio transmission power consumption sampling period. The instructions, when executed by the at least one processor, further cause the network node device at least to perform determining the radio transmission power threshold for the consecutive radio transmission power consumption sampling period based at least on the executed real time computation subprocedure.

In an example embodiment, alternatively or in addition to the above-described example embodiments, the instructions, when executed by the at least one processor, further cause the network node device to perform: in response to a non-real time skip condition not being met, triggering, during the current radio transmission power consumption sampling period, a computing node to execute a non-real time computation subprocedure for determining the radio transmission power threshold for the consecutive radio transmission power consumption sampling period based on the evaluated function of the radio transmission power consumption over a previous radio transmission power consumption sampling period, and obtaining a result of the non-real time computation subprocedure from the computing node before the end of the current radio transmission power consumption sampling period. The determining of the radio transmission power threshold for the consecutive radio transmission power consumption sampling period is further based on the obtained result of the non-real time computation subprocedure.

In an example embodiment, alternatively or in addition to the above-described example embodiments, the non-real time skip condition comprises a first non-real time skip condition:

$c_{t-i} \geq \rho \overline{C}$ for all $i=1, \ldots, \min(t, W-1)$, with t representing the current radio transmission power consumption sampling period, $c_t$ representing the radio transmission power consumption over the current radio transmission power consumption sampling period t, $\overline{C}$ representing a predetermined upper limit for the radio transmission power, $\rho\overline{C}$ representing a predetermined minimum value for the radio transmission power threshold with $\rho$ being between 0 and 1, and W representing a number of radio transmission power consumption sampling periods within a sliding time window $T_{avg}$.

In an example embodiment, alternatively or in addition to the above-described example embodiments, the non-real time skip condition comprises a second non-real time skip condition:

$\ell_t \leq W-1$, wherein $$\ell_t = \operatorname*{argmax}_{0 \leq k \leq \min(t, W-1)} \sum_{i=1}^{k} (c_{t-i} - \rho\overline{C}),$$

with t representing the current radio transmission power consumption sampling period, $c_t$ representing the radio transmission power consumption over the current radio transmission power consumption sampling period t, $\overline{C}$ representing a predetermined upper limit for the radio transmission power, $\rho\overline{C}$ representing a predetermined minimum value for the radio transmission power threshold with $\rho$ being between 0 and 1, and W representing a number of radio transmission power consumption sampling periods within a sliding time window $T_{avg}$.

In an example embodiment, alternatively or in addition to the above-described example embodiments:
when the first non-real time skip condition is met, the real time computation subprocedure comprises $x_t := [x_{t-1} + c_t - c_{t-w+1}]^+$;
when the second non-real time skip condition is met, the real time computation subprocedure comprises $x_t := [x_{t-1} + c_t - \rho\overline{C}]^+$; and
when neither the first non-real time skip condition nor the second non-real time skip condition is met, the real time computation subprocedure comprises $x_t := [\tilde{x}t + c_t - \rho$ $\overline{C}$ ]$^+$, with $\tilde{x}_t$ representing the obtained result of the non-real time computation subprocedure.

In an example embodiment, alternatively or in addition to the above-described example embodiments, the radio transmission power threshold for the consecutive radio transmission power consumption sampling period t+1 comprises $\gamma^*_{t+1} = \rho\overline{C}(1-p)W - x_t$.

In an example embodiment, alternatively or in addition to the above-described example embodiments, the non-real time computation subprocedure comprises:

if t=0:

set $\tilde{x}_t = 0$ else:

initialize $\tilde{x}_t := 0$;

for $i = \min(t+1, W-1), \ldots, 2$:

set $\tilde{x}_t := [\tilde{x}_t + c_{t+1-i} - \rho\overline{C}]^+$ with $\tilde{x}_t$ representing the result of the non-real time computation subprocedure.

In an example embodiment, alternatively or in addition to the above-described example embodiments, the instructions, when executed by the at least one processor, further cause the network node device to perform modifying the minimum value for the radio transmission power threshold based on current traffic delay requirements.

In an example embodiment, alternatively or in addition to the above-described example embodiments, the function of the radio transmission power consumption comprises equivalent isotropic radiated power consumption.

In an example embodiment, alternatively or in addition to the above-described example embodiments, the real time computation is executed by a distributed unit of the network node device.

An example embodiment of a network node device comprises means for causing the network node device at least to perform evaluating a function of radio transmission power consumption over a current radio transmission power consumption sampling period at the end of the current radio transmission power consumption sampling period. The means are further configured to cause the network node device at least to execute a real time computation subprocedure for determining a radio transmission power threshold for a consecutive radio transmission power consumption sampling period based on the evaluated function of the radio transmission power consumption over the current radio transmission power consumption sampling period, such that the function of the radio transmission power consumption over a given radio transmission power consumption sampling period does not exceed the radio transmission power threshold for the given radio transmission power consumption sampling period. The means are further configured to cause the network node device at least to determine the radio transmission power threshold for the consecutive radio transmission power consumption sampling period based at least on the executed real time computation subprocedure.

In an example embodiment, alternatively or in addition to the above-described example embodiments, the means are further configured to cause the network node device at least to: in response to a non-real time skip condition not being met, trigger, during the current radio transmission power consumption sampling period, a computing node to execute a non-real time computation subprocedure for determining the radio transmission power threshold for the consecutive radio transmission power consumption sampling period based on the evaluated function of the radio transmission power consumption over a previous radio transmission power consumption sampling period, and obtain a result of the non-real time computation subprocedure from the computing node before the end of the current radio transmission power consumption sampling period. The determining of the radio transmission power threshold for the consecutive radio transmission power consumption sampling period is further based on the obtained result of the non-real time computation subprocedure.

In an example embodiment, alternatively or in addition to the above-described example embodiments, the non-real time skip condition comprises a first non-real time skip condition:

$c_{t-i} \geq \rho\overline{C}$ for all $i=1, \ldots, \min(t, W-1)$, with t representing the current radio transmission power consumption sampling period, $c_t$ representing the radio transmission power consumption over the current radio transmission power consumption sampling period t, $\overline{C}$ representing a predetermined upper limit for the radio transmission power, $\rho\overline{C}$ representing a predetermined minimum value for the radio transmission power threshold with $\rho$ being between 0 and 1, and W representing a number of radio transmission power consumption sampling periods within a sliding time window $T_{avg}$.

In an example embodiment, alternatively or in addition to the above-described example embodiments, the non-real time skip condition comprises a second non-real time skip condition:

$\ell_t \leq W-1$, wherein $\ell_t = \arg\max \Sigma_{i=1}^{k}(c_{t-i} - \rho\overline{C})$, $0 \leq k \leq \min(t, W-1)$ with t representing the current radio transmission power consumption sampling period, $c_t$ representing the radio transmission power consumption over the current radio transmission power consumption sampling period t, $\overline{C}$ representing a predetermined upper limit for the radio transmission power, $\rho\overline{C}$ representing a predetermined minimum value for the radio transmission power threshold with $\rho$ being between 0 and 1, and W representing a number of radio transmission power consumption sampling periods within a sliding time window $T_{avg}$.

In an example embodiment, alternatively or in addition to the above-described example embodiments:

when the first non-real time skip condition is met, the real time computation subprocedure comprises $x_t := [x_{t-1} + c_t - c_{t-w+1}]^+$;

when the second non-real time skip condition is met, the real time computation subprocedure comprises $x_t := [x_{t-1} + c_t - \rho\overline{C}]^+$; and when neither the first non-real time skip condition nor the second non-real time skip condition is met, the real time computation subprocedure comprises $x_t := [\tilde{x}_t + c_t - \rho\overline{C}]^+$, with $\tilde{x}_t$ representing the obtained result of the non-real time computation subprocedure.

In an example embodiment, alternatively or in addition to the above-described example embodiments, the radio transmission power threshold for the consecutive radio transmission power consumption sampling period t+1 comprises $\gamma^*_{t+1} = \rho \overline{C} + \overline{C}(1-\rho)W - x_t$.

In an example embodiment, alternatively or in addition to the above-described example embodiments, the non-real time computation subprocedure comprises:

if t=0:

set $\tilde{x}_t = 0$ else:

initialize $\tilde{x}_t := 0$;

for $i = \min(t+1, W-1), \ldots, 2$:

set $\tilde{x}_t := [\tilde{x}_t + c_{t+1-i} - \rho\overline{C}]^+$ with $\tilde{x}_t$ representing the result of the non-real time computation subprocedure.

In an example embodiment, alternatively or in addition to the above-described example embodiments, the means are further configured to cause the network node device at least to modify the minimum value for the radio transmission power threshold based on current traffic delay requirements.

In an example embodiment, alternatively or in addition to the above-described example embodiments, the function of the radio transmission power consumption comprises equivalent isotropic radiated power consumption.

In an example embodiment, alternatively or in addition to the above-described example embodiments, the real time computation is executed by a distributed unit of the network node device.

An example embodiment of a method comprises evaluating, by a network node device, a function of radio transmission power consumption over a current radio transmission power consumption sampling period at the end of the current radio transmission power consumption sampling period. The method further comprises executing, by the network node device, a real time computation subprocedure for determining a radio transmission power threshold for a consecutive radio transmission power consumption sampling period based on the evaluated function of the radio transmission power consumption over the current radio transmission power consumption sampling period, such that the function of the radio transmission power consumption over a given radio transmission power consumption sampling period does not exceed the radio transmission power threshold for the given radio transmission power consumption sampling period. The method further comprises determining, by the network node device, the radio transmission power threshold for the consecutive radio transmission power consumption sampling period based at least on the executed real time computation subprocedure.

In an example embodiment, alternatively or in addition to the above-described example embodiments, the method further comprises: in response to a non-real time skip condition not being met, triggering, by the network node device, during the current radio transmission power consumption sampling period, a computing node to execute a non-real time computation subprocedure for determining the radio transmission power threshold for the consecutive radio transmission power consumption sampling period based on the evaluated function of the radio transmission power consumption over a previous radio transmission power consumption sampling period, and obtaining, by the network node device, a result of the non-real time computation subprocedure from the computing node before the end of the current radio transmission power consumption sampling period. The determining of the radio transmission power threshold for the consecutive radio transmission power consumption sampling period is further based on the obtained result of the non-real time computation subprocedure.

In an example embodiment, alternatively or in addition to the above-described example embodiments, the non-real time skip condition comprises a first non-real time skip condition:

$c_{t-i} \geq \rho\overline{C}$ for all $i = 1, \ldots, \min(t, W-1)$, with t representing the current radio transmission power consumption sampling period, $c_t$ representing the radio transmission power consumption over the current radio transmission power consumption sampling period t, $\overline{C}$ representing a predetermined upper limit for the radio transmission power, $\rho\overline{C}$ representing a predetermined minimum value for the radio transmission power threshold with $\rho$ being between 0 and 1, and W representing a number of radio transmission power consumption sampling periods within a sliding time window $T_{avg}$.

In an example embodiment, alternatively or in addition to the above-described example embodiments, the non-real time skip condition comprises a second non-real time skip condition:

$\ell_t \leq W-1$, wherein $$\ell_t = \operatorname*{argmax}_{0 \leq k \leq \min(t, W-1)} \sum_{i=1}^{k} (c_{t-i} - \rho\overline{C}),$$

with t representing the current radio transmission power consumption sampling period, $c_t$ representing the radio transmission power consumption over the current radio transmission power consumption sampling period t, $\overline{C}$ representing a predetermined upper limit for the radio transmission power, $\rho\overline{C}$ representing a predetermined minimum value for the radio transmission power threshold with $\rho$ being between 0 and 1, and W representing a number of radio transmission power consumption sampling periods within a sliding time window $T_{avg}$.

In an example embodiment, alternatively or in addition to the above-described example embodiments:

when the first non-real time skip condition is met, the real time computation subprocedure comprises $x_t := [x_{t-1} + c_t - c_{t-w+1}]^+$;

when the second non-real time skip condition is met, the real time computation subprocedure comprises $x_t := [x_{t-1} + c_t - \rho\overline{C}]^+$; and when neither the first non-real time skip condition nor the second non-real time skip condition is met, the real time computation subprocedure comprises $x_t := [\tilde{x}_t + c_t - \rho\overline{C}]^+$, with $\tilde{x}_t$ representing the obtained result of the non-real time computation subprocedure.

In an example embodiment, alternatively or in addition to the above-described example embodiments, the radio transmission power threshold for the consecutive radio transmission power consumption sampling period t+1 comprises $\gamma^*_{t+1} = \rho\overline{C}(1-\rho)W - x_t$.

In an example embodiment, alternatively or in addition to the above-described example embodiments, the non-real time computation subprocedure comprises:

if t=0:

set $\tilde{x}_t=0$ else:

initialize $\tilde{x}_t:=0$;

for $i=\min(t+1,W-1),\ldots,2$:

set $\tilde{x}_t:=[\tilde{x}_t+c_{t+1-i}-\rho\overline{C}]^+$ with $\tilde{x}_t$ representing the result of the non-real time computation subprocedure.

In an example embodiment, alternatively or in addition to the above-described example embodiments, the method further comprises modifying, by the network node device, the minimum value for the radio transmission power threshold based on current traffic delay requirements.

In an example embodiment, alternatively or in addition to the above-described example embodiments, the function of the radio transmission power consumption comprises equivalent isotropic radiated power consumption.

In an example embodiment, alternatively or in addition to the above-described example embodiments, the real time computation is executed by a distributed unit of the network node device.

An example embodiment of a computer program comprises instructions for causing a network node device to perform at least the following: evaluating a function of radio transmission power consumption over a current radio transmission power consumption sampling period at the end of the current radio transmission power consumption sampling period, executing a real time computation subprocedure for determining a radio transmission power threshold for a consecutive radio transmission power consumption sampling period based on the evaluated function of the radio transmission power consumption over the current radio transmission power consumption sampling period such that the function of the radio transmission power consumption over a given radio transmission power consumption sampling period does not exceed the radio transmission power threshold for the given radio transmission power consumption sampling period, and determining the radio transmission power threshold for the consecutive radio transmission power consumption sampling period based at least on the executed real time computation subprocedure.

An example embodiment of a computing node comprises at least one processor, and at least one memory storing instructions that, when executed by the at least one processor, cause the computing node at least to perform, in response to being triggered during a current radio transmission power consumption sampling period by a network node device to execute a non-real time computation subprocedure for determining a radio transmission power threshold for a consecutive radio transmission power consumption sampling period, retrieving stored samples of radio transmission power consumption. The instructions, when executed by the at least one processor, further cause the computing node at least to perform executing the non-real time computation subprocedure based on the retrieved samples of the radio transmission power consumption. The instructions, when executed by the at least one processor, further cause the computing node at least to perform providing a result of the non-real time computation subprocedure to the network node device before the end of the current radio transmission power consumption sampling period.

In an example embodiment, alternatively or in addition to the above-described example embodiments, the non-real time computation subprocedure comprises:

if t=0:

set $\tilde{x}_t=0$ else:

initialize $\tilde{x}_t:=0$;

for $i=\min(t+1,W-1),\ldots,2$:

set $\tilde{x}_t:=[\tilde{x}_t+c_{t+1-i}-\rho\overline{C}]^+$, wherein t represents the current radio transmission power consumption sampling period, $c_t$ represents the radio transmission power consumption over the current radio transmission power consumption sampling period t, $\overline{C}$ represents a predetermined upper limit for the radio transmission power, $\rho\overline{C}$ represents a predetermined minimum value for the radio transmission power threshold with $\rho$ being between 0 and 1, W represents a number of radio transmission power consumption sampling periods within a sliding time window $T_{avg}$, and it represents the result of the non-real time computation subprocedure.

In an example embodiment, alternatively or in addition to the above-described example embodiments, the computing node is comprised in the network node device.

In an example embodiment, alternatively or in addition to the above-described example embodiments, the non-real time computation is executed by a centralized unit or a distributed unit of the network node device.

An example embodiment of a computing node comprises means for causing the computing node at least to, in response to being triggered during a current radio transmission power consumption sampling period by a network node device to execute a non-real time computation subprocedure for determining a radio transmission power threshold for a consecutive radio transmission power consumption sampling period, retrieve stored samples of radio transmission power consumption. The means are further configured to cause the computing node at least to execute the non-real time computation subprocedure based on the retrieved samples of the radio transmission power consumption. The means are further configured to cause the computing node at least to provide a result of the non-real time computation subprocedure to the network node device before the end of the current radio transmission power consumption sampling period.

In an example embodiment, alternatively or in addition to the above-described example embodiments, the non-real time computation subprocedure comprises:

if t=0:

set $\tilde{x}_t=0$ else:

initialize $\tilde{x}_t:=0$;

for $i=\min(t+1,W-1),\ldots,2$:

set $\tilde{x}_t:=[\tilde{x}_t+c_{t+1-i}-\rho\overline{C}]^+$, wherein t represents the current radio transmission power consumption sampling period, $c_t$ represents the radio transmission power consumption over the current radio transmission power consumption sampling period t, $\overline{C}$ represents a predetermined upper limit for the radio transmission power, $\rho\overline{C}$ represents a predetermined minimum value for the radio transmission power threshold with $\rho$ being between 0 and 1, W represents a number of radio transmission power consumption sampling periods within a sliding time window $T_{avg}$, and it represents the result of the non-real time computation subprocedure.

In an example embodiment, alternatively or in addition to the above-described example embodiments, the computing node is comprised in the network node device.

In an example embodiment, alternatively or in addition to the above-described example embodiments, the non-real time computation is executed by a centralized unit or a distributed unit of the network node device.

An example embodiment of a method comprises, in response to being triggered during a current radio transmission power consumption sampling period by a network node device to execute a non-real time computation subprocedure for determining a radio transmission power threshold for a consecutive radio transmission power consumption sampling period, retrieving by a computing node stored samples of radio transmission power consumption. The method further comprises executing, by the computing node, the non-real time computation subprocedure based on the retrieved samples of the radio transmission power consumption. The method further comprises providing, by the computing node, a result of the non-real time computation subprocedure to the network node device before the end of the current radio transmission power consumption sampling period.

In an example embodiment, alternatively or in addition to the above-described example embodiments, the non-real time computation subprocedure comprises:

if t=0:

set $\tilde{x}_t = 0$ else:

initialize $\tilde{x}_t := 0$;

for $i = \min(t+1, W-1), \ldots, 2$:

set $\tilde{x}_t := [\tilde{x}_t + c_{t+1-i} - \rho\overline{C}]^+$ initialize $\tilde{x}_t := 0$;

for $i = \min(t+1, W-1), \ldots, 2$:

set $\tilde{x}_t := [\tilde{x}_t + c_{t+1-i} - \rho\overline{C}]^+$ wherein t represents the current radio transmission power consumption sampling period, $c_t$ represents the radio transmission power consumption over the current radio transmission power consumption sampling period t, $\overline{C}$ represents a predetermined upper limit for the radio transmission power, $\rho\overline{C}$ represents a predetermined minimum value for the radio transmission power threshold with $\rho$ being between 0 and 1, W represents a number of radio transmission power consumption sampling periods within a sliding time window $T_{avg}$, and $\tilde{x}_t$ represents the result of the non-real time computation subprocedure.

In an example embodiment, alternatively or in addition to the above-described example embodiments, the computing node is comprised in the network node device.

In an example embodiment, alternatively or in addition to the above-described example embodiments, the non-real time computation is executed by a centralized unit or a distributed unit of the network node device.

An example embodiment of a computer program comprises instructions for causing a computing node to perform at least the following: in response to being triggered during a current radio transmission power consumption sampling period by a network node device to execute a non-real time computation subprocedure for determining a radio transmission power threshold for a consecutive radio transmission power consumption sampling period, retrieving stored samples of radio transmission power consumption; executing the non-real time computation subprocedure based on the retrieved samples of the radio transmission power consumption; and providing a result of the non-real time computation subprocedure to the network node device before the end of the current radio transmission power consumption sampling period.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
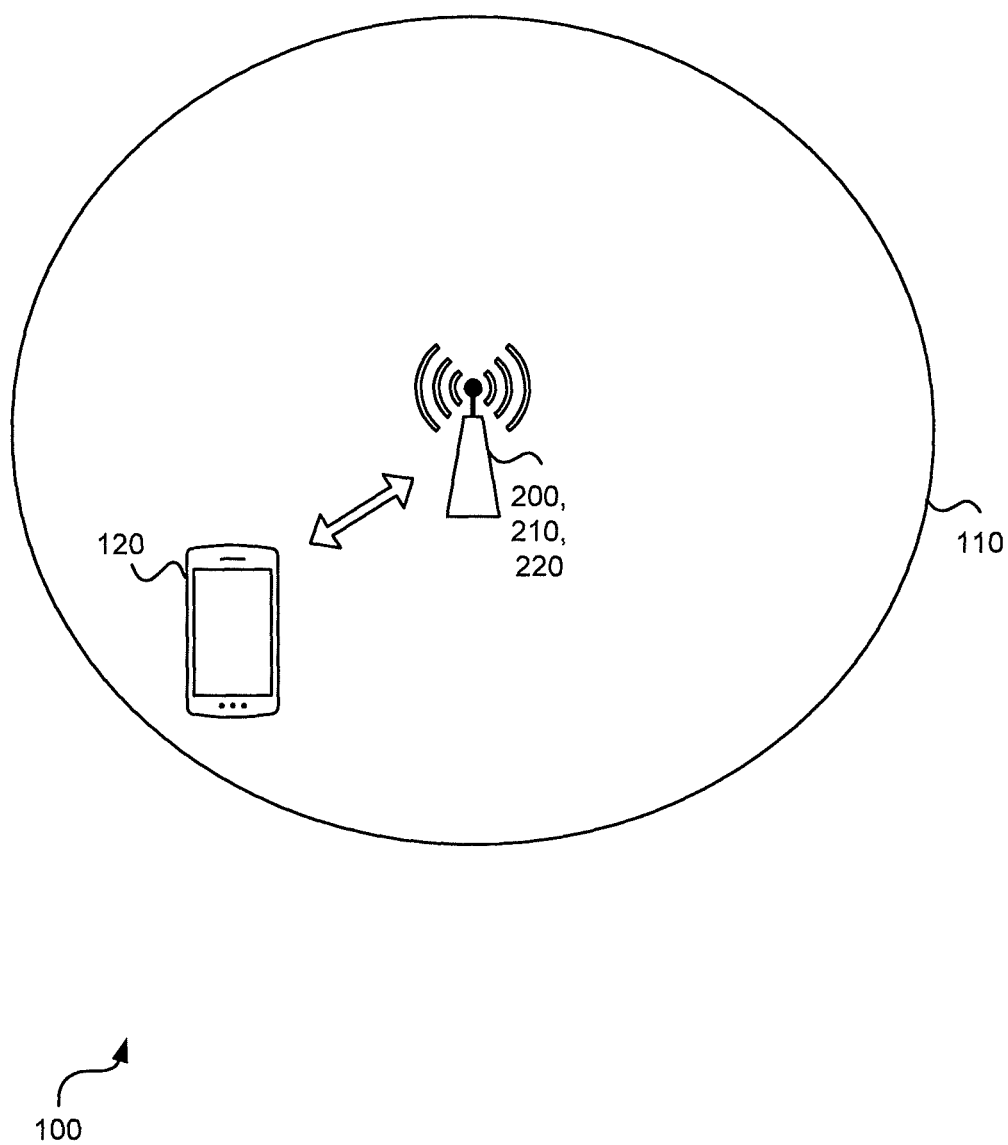
FIG. 1 shows an example embodiment of the subject matter described herein illustrating an example system, where various embodiments of the present disclosure may be implemented.

FIG. 1 illustrates an example system 100, where various embodiments of the present disclosure may be implemented. The system 100 may comprise a fifth generation (5G) new radio (NR) network or a network beyond 5G wireless networks, 110. An example representation of the system 100 is shown depicting a client device 120 and a network node device 200. The system 100 may further comprise a computing node 210 and/or a storage 220. At least in some embodiments, the computing node 210 and/or the storage 220 may be comprised in or be implemented as a part of the computing node 210. At least in some embodiments, the network 110 may comprise one or more massive machineto-machine (M2M) network(s), massive machine type communications (mMTC) network(s), internet of things (IoT) network(s), industrial internet-of-things (IIoT) network(s), enhanced mobile broadband (eMBB) network(s), ultra-reliable low-latency communication (URLLC) network(s), and/ or the like. In other words, the network 110 may be configured to serve diverse service types and/or use cases, and it may logically be seen as comprising one or more networks.

The client device 200 may include, e.g., a mobile phone, a smartphone, a tablet computer, a smart watch, or any hand-held, portable and/or wearable device. The client device 200 may also be referred to as a user equipment (UE). The network node device 210 may comprise a base station. The base station may include, e.g., any device suitable for providing an air interface for client devices to connect to a wireless network via wireless transmissions.

In the following, various example embodiments will be discussed. At least some of these example embodiments described herein may allow determining a radio transmission power threshold.

At least some of the example embodiments described herein may allow improving resource usage by serving a maximum amount of traffic and not wasting resources, while also ensuring the possibility of serving a minimum traffic level. This may be beneficial for congestion and call access control, for example.

At least some of the example embodiments described herein may allow optimizing deployment in a radion access network (RAN) with real time and non-real time operations.

At least some of the example embodiments described herein may allow support for a dynamic guaranteed level of traffic.

At least some of the example embodiments described herein may allow a network node device to transmit an incremental amount of power per sampling period while still guaranteeing constraints on average power and guaranteed traffic.

At least some of the example embodiments described herein may allow performing a bulk of the computations in a non-real time manner, such that a network node device may still produce the new value of an optimal threshold before the start of a next sampling period.

At least some of the example embodiments described herein may allow computing, in a sampling period t', a maximum power threshold $\gamma_t$, such that the two following conditions are satisfied:

a) a function of the emitted power $c_t$ across sampling periods t (with the understanding that $c_t(\gamma_t) \leq \gamma_t$) averaged over a sliding window of W periods does not exceed an upper limit C:

$$\frac{1}{W} \sum_{i=t-min(t,W-1)}^{t} c_i(\gamma_i) \leq \overline{C}, \ \forall t \geq t'$$

b) power thresholds are higher than or equal to a minimum level $\rho\overline{C}$, with $0 \leq \rho \leq 1$, i.e., $\gamma_t \geq \rho\overline{C}$ for all $t \geq t'$.

Figure 2A:
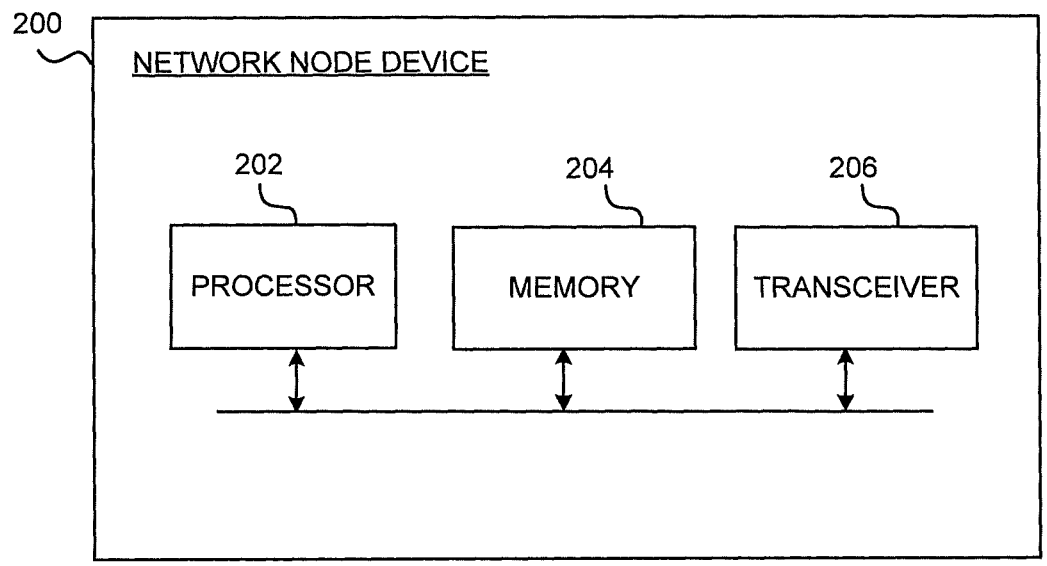
FIG. 2A shows an example embodiment of the subject matter described herein illustrating a network node device.

FIG. 2A is a block diagram of the network node device 200, in accordance with an example embodiment.

The network node device 200 comprises one or more processors 202 and one or more memories 204 that comprise computer program code. The network node device 200 may also include other elements, such as a transceiver 206 configured to enable the network node device 200 to transmit and/or receive information to/from other devices, as well as other elements not shown in FIG. 2A. In one example, the network node device 200 may use the transceiver 206 to transmit or receive signaling information and data in accordance with at least one cellular communication protocol. The transceiver 206 may be configured to provide at least one wireless radio connection, such as for example a 3GPP mobile broadband connection (e.g., 5G or beyond). The transceiver 206 may comprise, or be configured to be coupled to, at least one antenna to transmit and/or receive radio frequency signals.

Although the network node device 200 is depicted to include only one processor 202, the network node device 200 may include more processors. In an embodiment, the memory 204 is capable of storing instructions, such as an operating system and/or various applications. Furthermore, the memory 204 may include a storage that may be used to store, e.g., at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network (NN) chip, an artificial intelligence (AI) accelerator, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The network node device 200 may comprise a base station. The base station may include, e.g., a fifth-generation base station (gNB) or any such device providing an air interface for client devices to connect to a wireless network via wireless transmissions.

At least in some embodiments, during a current radio transmission power consumption sampling period and in response to a non-real time skip condition not being met, instructions stored in the at least one memory 204 may, when executed by the at least one processor 202, cause the network node device 200 to perform triggering the computing node 210 to execute a non-real time computation sub-procedure for determining a radio transmission power threshold for a consecutive radio transmission power consumption sampling period based on an evaluated function of radio transmission power consumption over a previous radio transmission power consumption sampling period. For example, the function of the radio transmission power consumption may comprise equivalent isotropic radiated power (EIRP) consumption.

Herein, the non-real time computation subprocedure refers to a computation subprocedure that is to be carried out within a radio transmission power consumption sampling period (which is significantly longer than a time slot duration). The term "non-real time skip condition" refers to a condition under which the non-real time computations are skipped.

For example, the non-real time skip condition may comprise a first non-real time skip condition:

$$c_{t-i} \geq \rho\overline{C} \text{ for all } i=1,\ldots,\min t, W-1,$$

with t representing the current radio transmission power consumption sampling period, $c_t$ representing the radio transmission power consumption over the current radio transmission power consumption sampling period t, $\overline{C}$ representing a predetermined upper limit for the radio transmission power, $\rho\overline{C}$ representing a predetermined minimum value for the radio transmission power threshold with $\rho$ being between 0 and 1, and W representing a number of radio transmission power consumption sampling periods within a sliding time window $T_{avg}$.

In other words, the first non-real time skip condition may correspond to a case in which none of the past W−1 radio transmission power consumption values fall below the guaranteed level $\rho\overline{C}$.

At least in some embodiments, to assess whether the first non-real time skip condition is met, the network node device 200 may keep a counter that is incremented by one if the current radio transmission power consumption $c_t \geq \rho\overline{C}$ and set to 0 otherwise. If the counter $\geq W-1$, then the first non-real time skip condition is met.

In another example, the non-real time skip condition may comprise a second non-real time skip condition:

$$\ell_t \leq W-1,$$

wherein $$\ell_t = \underset{0 \leq k \leq \min(t, W-1)}{\operatorname{argmax}} \sum_{i=1}^{k}(c_{t-i} - \rho\overline{C}).$$

For example, the non-real time computation subprocedure may comprise:

if t=0:

set $\tilde{x}_t = 0$ else:

initialize $\tilde{x}_t := 0$;

for $i = \min(t+1, W-1), \ldots, 2$:

set $\tilde{x}_t := [\tilde{x}_t + c_{t+1-i} - \rho\overline{C}]^+$ with $\tilde{x}_t$ representing the result of the non-real time computation subprocedure.

Herein, a notation of the form $[a+b]^+$ represents one sum and a max operation. Furthermore, a convention is used that if more than one index achieves a maximum, then the lowest index of these is taken.

At least in some embodiments, to assess whether the second non-real time skip condition is met, the network node device 200 may keep a counter $\ell$ that is set to 0 if $c_t = 0$, otherwise it is incremented by one, since if $x_t = 0$ then $\ell_t = 0$, otherwise $\ell_t = \ell_{t-1} + 1$.

In the above embodiments, when executed by the at least one processor 202, the instructions stored in the at least one memory 204 may further cause the network node device 200 to perform obtaining the result of the non-real time computation subprocedure from the computing node 210 before the end of the current radio transmission power consumption sampling period.

When executed by the at least one processor 202, the instructions stored in the at least one memory 204 cause the network node device 200 at least to perform evaluating the function of the radio transmission power consumption over the current radio transmission power consumption sampling period at the end of the current radio transmission power consumption sampling period. When executed by the at least one processor 202, the instructions stored in the at least one memory 204 may further cause the network node device 200 to perform storing the evaluated radio transmission power consumption ce over the current radio transmission power consumption sampling period t in a storage, such as the storage 220 or the memory 214, thereby making it possible for the storage to evict $c_{t-w}+$.

The instructions, when executed by the at least one processor 202, further cause the network node device 200 at least to perform executing a real time computation subprocedure for determining a radio transmission power threshold for a consecutive radio transmission power consumption sampling period based on the evaluated function of the radio transmission power consumption over the current radio transmission power consumption sampling period, such that the function of the radio transmission power consumption over a given radio transmission power consumption sampling period does not exceed the radio transmission power threshold for the given radio transmission power consumption sampling period. Herein, the real time computation subprocedure refers to a computation subprocedure that is to be carried out within one time slot.

For example, when the first non-real time skip condition is met, the real time computation subprocedure may comprise $x_t := [x_{t-1} + c_t - c_{t-w+1}]^+$. When the second non-real time skip condition is met, the real time computation subprocedure may comprise $x_t := [x_{t-1} + c_t - \rho\overline{C}]^+$ (where $x_{t-1}$ represents the result of the computations in the previous sampling period t−1). When neither the first non-real time skip condition nor the second non-real time skip condition is met, the real time computation subprocedure may comprise $x_t := [\tilde{x}_t + c_t - \rho\overline{C}]^+$, with $\tilde{x}_t$ representing the obtained result of the non-real time computation subprocedure.

The instructions, when executed by the at least one processor 202, further cause the network node device 200 at least to perform determining the radio transmission power threshold $\gamma_{t+1}$ for the consecutive radio transmission power consumption sampling period t+1 (i.e., to be applied over the consecutive radio transmission power consumption sampling period t+1) based at least on the executed real time computation subprocedure. In the embodiments involving the non-real time computation subprocedure by the computing node 210, the determining of the radio transmission power threshold for the consecutive radio transmission power consumption sampling period may be further based on the obtained result of the non-real time computation subprocedure. Thus, the determined radio transmission power threshold $\gamma_{t+1}$ for the consecutive radio transmission power consumption sampling period t+1 caps the radio transmission power consumption $c_{t+1}$ over the same period.

For example, the radio transmission power threshold for the consecutive radio transmission power consumption sampling period t+1 may comprise $\gamma^*_{t+1} = \rho\overline{C} + \overline{C}(1-\rho)W - x_t$.

In other words, at least in some embodiments, the radio transmission power threshold γ* that the present disclosure allows the network node device 200 to compute may generally be defined as:

$$\gamma_t^* = \rho\overline{C} + \overline{C}(1-\rho)W - \max_{0 \leq k \leq \min(t, W-1)} \sum_{i=1}^{k}(c_{t-i} - \rho\overline{C}), \quad \forall\, t \geq 0.$$

At least in some of the disclosed embodiments, the radio transmission power threshold $\gamma^*_t$ may guarantee that: a sliding average radio transmission power consumption does not exceed $\overline{C}$, the radio transmission power threshold $\gamma^*_t$ may never be lower than $\rho\overline{C}$, and/or given past consumption, the radio transmission power threshold $\gamma^*_t$ may be the highest possible power threshold, i.e., it may not be overly conservative and may not waste resources.

At least in some of the disclosed embodiments, a full set of inputs $c_{t+1-\min(t+1,W-1)}, \ldots, c_t$ may be available at the end of the sampling period t, since $c_t$ may only be evaluated once the sampling period t is over. The full set of computations may generally not be performed within the last slot, especially when W is in the order of a few thousands (e.g., if one sampling period lasts 100 milliseconds (ms) and the average time window $T_{avg}=6$ minutes (min), then W=3600). However, the first W−2 rounds may only depend on power consumption values available at the beginning of the sampling period, namely $c_{t+1-\min(t+1,W-1)}, \ldots, c_{t-1}$. Therefore, the first W−2 rounds of the procedure above may be performed in non-real-time fashion—it may start at the first slot of the sampling period t while it may terminate before the last slot of sampling period t. Afterwards, in the last slot of period t the network node device 200 may evaluate the radio transmission power consumption during the current period t and perform the last round of the procedure in a real time manner.

The instructions, when executed by the at least one processor 202, may further cause the network node device 200 to perform modifying the minimum value for the radio transmission power threshold based on (e.g., as a function of) current traffic delay requirements. This may be beneficial, e.g., when a guaranteed bit rate traffic level may generally depend on the amount of traffic with stringent delay requirements.

For example, a current quality-of-service (QoS) class identifier (QCI) distribution of the traffic may be mapped to a value of the guaranteed traffic portion $\rho \in [0,1]$. Typically, the higher the number of users and the percentage of QCI traffic with guaranteed bit rate (GBR) requirements, the higher the value of ρ. Once a decision is made that ρ needs to be changed, flags for the first non-real time skip condition and the second non-real time skip condition may be forced to false, and the non-real time computation subprocedure may be triggered.

Figure 2B:
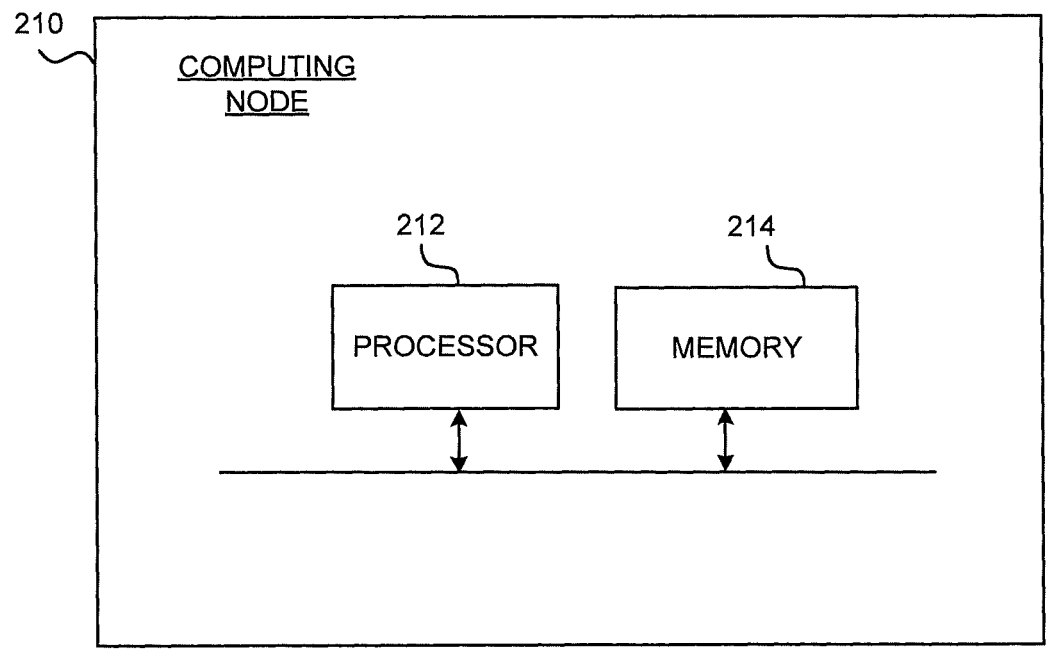
FIG. 2B shows an example embodiment of the subject matter described herein illustrating a computing node.

FIG. 2B is a block diagram of a computing node 210, in accordance with an example embodiment.

The computing node 210 comprises at least one processor 212 and at least one memory 214 including computer program code. The computing node 210 may also include other elements not shown in FIG. 2B.

Although the computing node 210 is depicted to include only one processor 212, the computing node 210 may include more processors. In an embodiment, the memory 214 is capable of storing instructions, such as an operating system and/or various applications. Furthermore, the memory 214 may include a storage that may be used to store, e.g., at least some of the information and data used in the disclosed embodiments.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network (NN) chip, an artificial intelligence (AI) accelerator, or the like. In an embodiment, the processor 212 may be configured to execute hard-coded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and non-volatile memory devices. For example, the memory 214 may be embodied as semiconductor memories (such as mask ROM, PROM (programmable ROM), EPROM (erasable PROM), flash ROM, RAM (random access memory), etc.).

In response to being triggered during the current radio transmission power consumption sampling period by the network node device 200 to execute the non-real time computation subprocedure for determining the radio transmission power threshold for the consecutive radio transmission power consumption sampling period, instructions stored in the at least one memory 214 cause, when executed by the at least one processor 212, the computing node 210 at least to perform retrieving stored samples of radio transmission power consumption (e.g., the last available W−2 consumption values). The samples of radio transmission power consumption may be stored, e.g., in an external storage 220 or in the memory 214.

The instructions, when executed by the at least one processor 212, further cause the computing node 210 at least to perform executing the non-real time computation subprocedure based on the retrieved samples of the radio transmission power consumption.

As discussed above in more detail, the non-real time computation subprocedure may comprise, e.g.:

if $t=0$:

set $\tilde{x}_t = 0$ else:

initialize $\tilde{x}_t := 0$;

for $i = \min(t+1, W-1), \ldots, 2$:

set $\tilde{x}_t := [\tilde{x}_t + c_{t+1-i} - \rho\overline{C}]^+$ with $\tilde{x}_t$ representing the result of the non-real time computation subprocedure.

The instructions, when executed by the at least one processor 212, further cause the computing node 210 at least to perform providing the result of the non-real time computation subprocedure to the network node device 200 before the end of the current radio transmission power consumption sampling period.

At least in some embodiments, the computing node 210 may be comprised in the network node device 200. In these embodiments, at least some of the at least one processor 212 may be comprised in at least some of the at least one processor 202, and/or at least some of the at least one memory 214 may be comprised in at least some of the at least one memory 204.

Further features of the computing node 210 directly result from the functionalities and parameters of the network node device 200 and thus are not repeated here.

At least in some of the described embodiments, the last W−1 samples of power consumption may be stored at each sampling period t, e.g., at the storage 220 or the memory 214.

Figure 3:
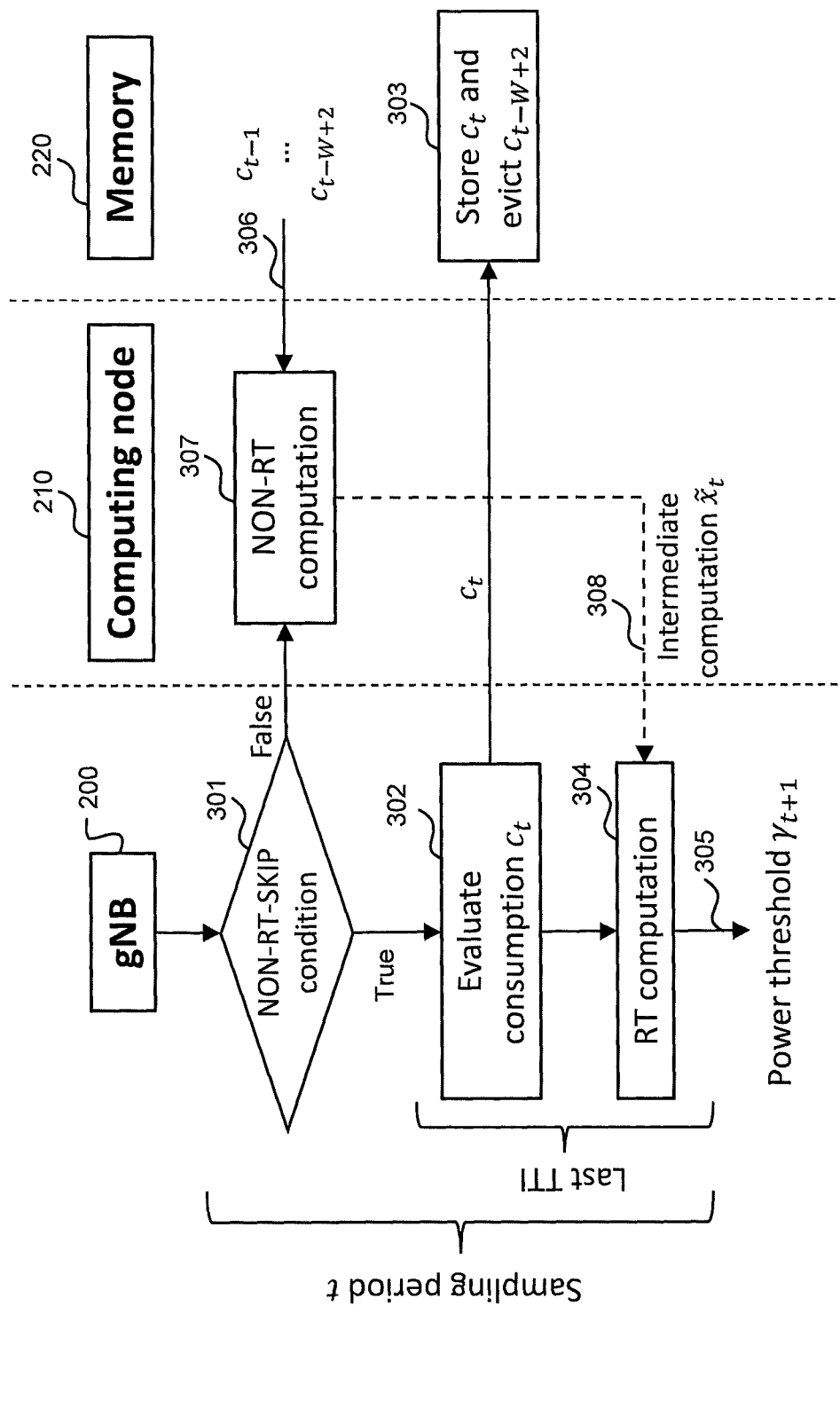
FIG. 3 shows an example embodiment of the subject matter described herein illustrating a method.

FIG. 3 illustrates an example diagram 300 of a method, in accordance with an example embodiment.

At optional operation 301, the network node device 200 may determine whether a non-real time skip condition is met. When the non-real time skip condition is met, the method may proceed directly to operation 302. When the non-real time skip condition is not met, the method may first perform operations 306, 307, 308, and then proceed to operation 302.

Thus, in response to the non-real time skip condition 301 not being met, the network node device 200 may trigger, during the current radio transmission power consumption sampling period, the computing node 210 to execute the non-real time computation subprocedure for determining the radio transmission power threshold for the consecutive radio transmission power consumption sampling period based on the evaluated function of the radio transmission power consumption over a previous radio transmission power consumption sampling period.

At operation 306, in response to being triggered by the network node device 200 to execute the non-real time computation subprocedure, the computing node 210 retrieves stored samples of radio transmission power consumption.

At operation 307, the computing node 210 executes the non-real time computation subprocedure based on the retrieved samples of the radio transmission power consumption.

At operation 308, the computing node 210 provides the result of the non-real time computation subprocedure to the network node device 200 before the end of the current radio transmission power consumption sampling period. Further at operation 308, the result of the non-real time computation subprocedure is obtained by the network node device 200 before the end of the current radio transmission power consumption sampling period.

At operation 302, the network node device 200 evaluates the function of the radio transmission power consumption over the current radio transmission power consumption sampling period at the end of the current radio transmission power consumption sampling period.

At optional operation 303, the network node device 200 may store the evaluated radio transmission power consumption over the current radio transmission power consumption sampling period at a storage, such as the storage 220 or the memory 214.

At operation 304, the network node device 200 executes the real time computation subprocedure for determining the radio transmission power threshold for the consecutive radio transmission power consumption sampling period based on the evaluated function of the radio transmission power consumption over the current radio transmission power consumption sampling period, such that the function of the radio transmission power consumption over a given radio transmission power consumption sampling period does not exceed the radio transmission power threshold for the given radio transmission power consumption sampling period.

At operation 305, the network node device 200 determines the radio transmission power threshold for the consecutive radio transmission power consumption sampling period based at least on the executed real time computation subprocedure. As discussed above in more detail, in the embodiments involving the non-real time computation subprocedure by the computing node 210, the determining of the radio transmission power threshold for the consecutive radio transmission power consumption sampling period may be further based on the obtained result of the non-real time computation subprocedure.

The method of diagram 300 may be performed by the network node device 200 of FIG. 2A and the computing node 210 of FIG. 2B. The operations 301, 302-305, and 308 can, for example, be performed by the at least one processor 202 and the at least one memory 204. The operations 306-308 can, for example, be performed by the at least one processor 212 and the at least one memory 214. Further features of the method of diagram 300 directly result from the functionalities and parameters of the network node device 200 and the computing node 210, and thus are not repeated here. The method of diagram 300 can be performed by computer program(s).

Figure 4:
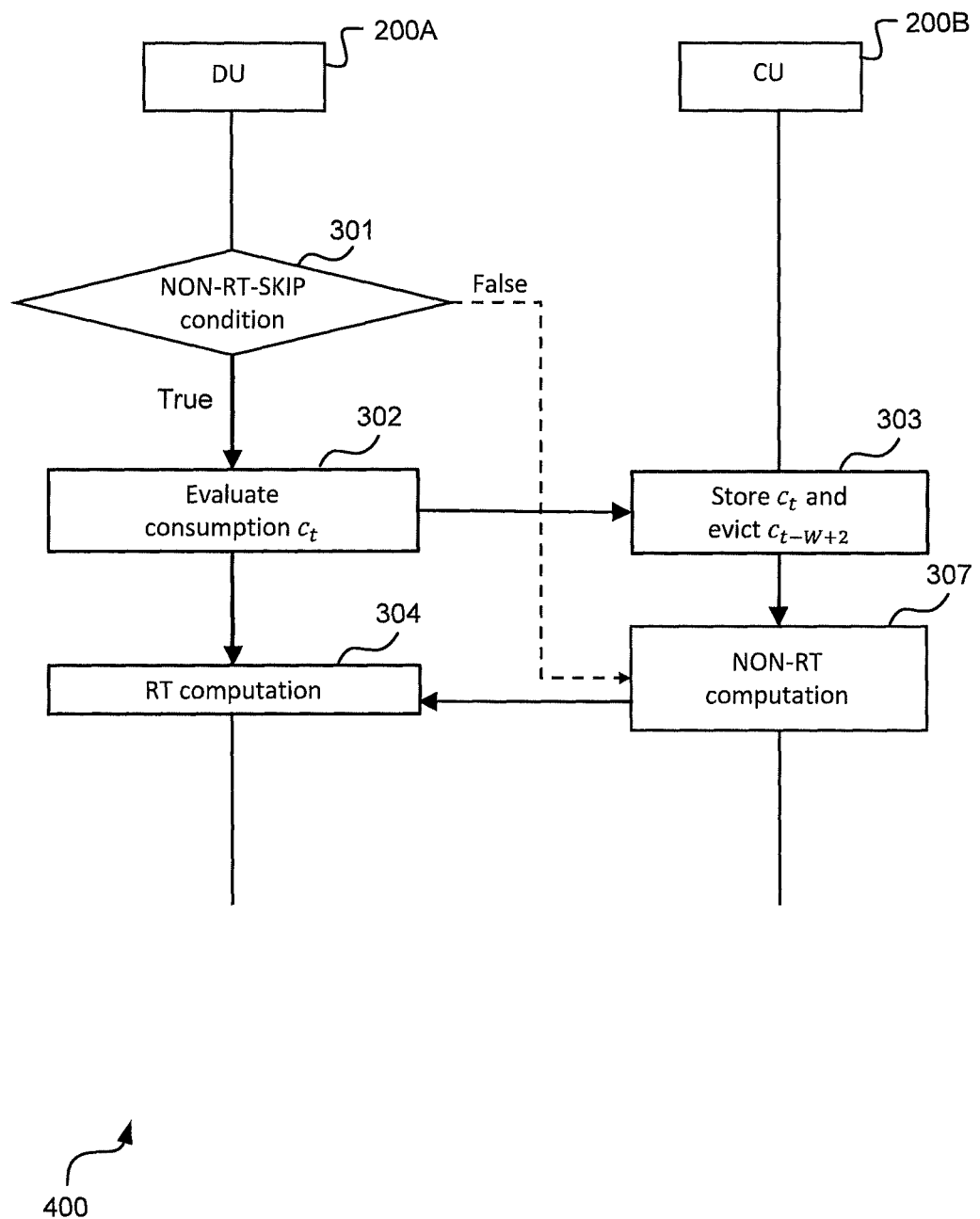
FIG. 4 shows an example embodiment of the subject matter described herein illustrating another method.

As illustrated in diagram 400 of FIG. 4, at least in some embodiments, the network node device 200 may comprise a distributed unit 200A and a centralized unit 200B, and the real time computation 304 may be executed by the distributed unit 200A, and/or the non-real time computation 307 may be executed by the centralized unit 200B or the distributed unit 200A.

The network node device 200 may comprise means for performing at least one method described herein. In one example, the means may comprise the at least one processor 202, and the at least one memory 204 storing instructions that, when executed by the at least one processor, cause the network node device 200 to perform the method.

The computing node 210 may comprise means for performing at least one method described herein. In one example, the means may comprise the at least one processor 212, and the at least one memory 214 storing instructions that, when executed by the at least one processor, cause the computing node 210 to perform the method.

The functionality described herein can be performed, at least in part, by one or more computer program product components such as software components. According to an embodiment, the network node device 200 and/or computing node 210 may comprise a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A network node device, comprising:
at least one processor; and
at least one non-transitory memory storing instructions that, when executed with the at least one processor, cause the network node device at least to perform:
at the end of a current radio transmission power consumption sampling period, evaluating a function of radio transmission power consumption over the current radio transmission power consumption sampling period;
executing a real time computation subprocedure for determining a radio transmission power threshold for a consecutive radio transmission power consumption sampling period based on the evaluated function of the radio transmission power consumption over the current radio transmission power consumption sampling period, such that the function of the radio transmission power consumption over a given radio transmission power consumption sampling period does not exceed the radio transmission power threshold for the given radio transmission power consumption sampling period, wherein the real time computation subprocedure refers to a computation subprocedure that is to be carried out within one time slot;
determining the radio transmission power threshold for the consecutive radio transmission power consumption sampling period based at least on the executed real time computation subprocedure; and
in response to a non-real time skip condition not being met, triggering, during the current radio transmission power consumption sampling period, a computing node to execute a non-real time computation subprocedure for determining the radio transmission power threshold for the consecutive radio transmission power consumption sampling period based on the evaluated function of the radio transmission power consumption over a previous radio transmission power consumption sampling period, and obtaining a result of the non-real time computation subprocedure from the computing node before the end of the current radio transmission power consumption sampling period,
wherein the non-real time computation subprocedure refers to a computation subprocedure that is to be carried out within a radio transmission power consumption sampling period, which is longer than a time slot duration;
wherein the determining of the radio transmission power threshold for the consecutive radio transmission power consumption sampling period is further based on the obtained result of the non-real time computation subprocedure, and
wherein the non-real time skip condition comprises a first non-real time skip condition:

$c_{t-i} \geq \rho\overline{C}$ for all $i=1, \ldots, \min(t, W-1)$, wherein t represents the current radio transmission power consumption sampling period, $c_t$ represents the radio transmission power consumption over the current radio transmission power consumption sampling period t, $\overline{C}$ represents a predetermined upper limit for the radio transmission power, $\rho\overline{C}$ represents a predetermined minimum value for the radio transmission power threshold with $\rho$ being between 0 and 1, and W represents a number of radio transmission power consumption sampling periods within a sliding time window $T_{avg}$.

2. The network node device according to claim 1, wherein the non-real time skip condition comprises a second non-real time skip condition:

$\ell_t \leq W-1$, wherein $$\ell_t = \operatorname*{argmax}_{0 \leq k \leq \min(t, W-1)} \sum_{i=1}^{k} (c_{t-i} - \rho\overline{C}),$$

wherein t represents the current radio transmission power consumption sampling period, $c_t$ represents the radio transmission power consumption over the current radio transmission power consumption sampling period t, $\overline{C}$ represents a predetermined upper limit for the radio transmission power, $\rho\overline{C}$ represents a predetermined minimum value for the radio transmission power threshold with ρ being between 0 and 1, and W represents a number of radio transmission power consumption sampling periods within a sliding time window $T_{avg}$.

3. The network node device according to claim 1, wherein:
when the first non-real time skip condition is met, the real time computation subprocedure comprises $x_t := [x_{t-1} + c_t - c_{t-w+1}]^+$;
when the second non-real time skip condition is met, the real time computation subprocedure comprises $x_t := [x_{t-1} + c_t - \rho\overline{C}]^+$; and
when neither the first non-real time skip condition nor the second non-real time skip condition is met, the real time computation subprocedure comprises $x_t := [\tilde{x}_t + c_t - \rho\overline{C}]^+$, wherein $\tilde{x}_t$ represents the obtained result of the non-real time computation subprocedure.

4. The network node device according to claim 3, wherein the radio transmission power threshold for the consecutive radio transmission power consumption sampling period t+1 comprises $\gamma^*_{t+1} = \rho\overline{C} + \overline{C}(1-\rho)W - x_t$.

5. The network node device according to claim 1, wherein the non-real time computation subprocedure comprises:

if $T=0$:

set $\tilde{x}_t = 0$ else:

initialize $\tilde{x}_t := 0$;

for $i = \min(t+1, W-1), \ldots, 2$:

set $\tilde{x}_t := [\tilde{x}_t + c_{t+1-i} - \rho\overline{C}]^+$, wherein $\tilde{x}_t$ represents the result of the non-real time computation subprocedure.

6. The network node device according to claim 1, wherein the instructions, when executed with the at least one processor, further cause the network node device to perform:
modifying the minimum value for the radio transmission power threshold based on current traffic delay requirements.

7. The network node device according to claim 1, wherein the function of the radio transmission power consumption comprises equivalent isotropic radiated power consumption.

8. The network node device according to claim 1, wherein the real time computation is executed with a distributed unit of the network node device.

9. A method, comprising:
at the end of a current radio transmission power consumption sampling period, evaluating with a network node device a function of radio transmission power consumption over the current radio transmission power consumption sampling period;
executing, with the network node device, a real time computation subprocedure for determining a radio transmission power threshold for a consecutive radio transmission power consumption sampling period based on the evaluated function of the radio transmission power consumption over the current radio transmission power consumption sampling period, such that the function of the radio transmission power consumption over a given radio transmission power consumption sampling period does not exceed the radio transmission power threshold for the given radio transmission power consumption sampling period, wherein the real time computation subprocedure refers to a computation subprocedure that is to be carried out within one time slot;
determining, with the network node device, the radio transmission power threshold for the consecutive radio transmission power consumption sampling period based at least on the executed real time computation subprocedure; and
in response to a non-real time skip condition not being met, triggering, during the current radio transmission power consumption sampling period, a computing node to execute a non-real time computation subprocedure for determining the radio transmission power threshold for the consecutive radio transmission power consumption sampling period based on the evaluated function of the radio transmission power consumption over a previous radio transmission power consumption sampling period, and obtaining a result of the non-real time computation subprocedure from the computing node before the end of the current radio transmission power consumption sampling period,
wherein the non-real time computation subprocedure refers to a computation subprocedure that is to be carried out within a radio transmission power consumption sampling period, which is longer than a time slot duration;
wherein the determining of the radio transmission power threshold for the consecutive radio transmission power consumption sampling period is further based on the obtained result of the non-real time computation subprocedure, and
wherein the non-real time skip condition comprises a first non-real time skip condition:

$c_{t-i} \geq \rho\overline{C}$ for all $i=1, \ldots, \min(t, W-1)$, wherein t represents the current radio transmission power consumption sampling period, $c_t$ represents the radio transmission power consumption over the current radio transmission power consumption sampling period t, $\overline{C}$ represents a redetermined upper limit for the radio transmission power, $\rho\overline{C}$ represents a redetermined minimum value for the radio transmission power threshold with ρ being between 0 and 1, and W represents a number of radio transmission power consumption sampling periods within a sliding time window $T_{avg}$.

* * * * *